US011027959B2

(12) United States Patent
Rowland et al.

(10) Patent No.: US 11,027,959 B2
(45) Date of Patent: Jun. 8, 2021

(54) FLUIDIZED POWDER VALVE SYSTEM

(71) Applicant: MATSYS INC., Sterling, VA (US)

(72) Inventors: Roderick Rowland, Fairfax, VA (US); Steven Lawver, Sterling, VA (US); Tony F. Zahrah, Fairfax Station, VA (US)

(73) Assignee: MATSYS INC., Sterling, VA (US)

( * ) Notice: Subject to any disclaimer, the term of this patent is extended or adjusted under 35 U.S.C. 154(b) by 32 days.

(21) Appl. No.: 16/023,486

(22) Filed: Jun. 29, 2018

(65) Prior Publication Data

US 2020/0002148 A1 Jan. 2, 2020

(51) Int. Cl.
| B67C 11/06 | (2006.01) |
| B29C 31/06 | (2006.01) |
| B29C 64/321 | (2017.01) |
| B29K 105/00 | (2006.01) |
| G01F 19/00 | (2006.01) |
| B33Y 40/00 | (2020.01) |

(52) U.S. Cl.
CPC .............. *B67C 11/06* (2013.01); *B29C 31/06* (2013.01); *B29C 64/321* (2017.08); *B29K 2105/251* (2013.01); *B33Y 40/00* (2014.12); *G01F 19/00* (2013.01)

(58) Field of Classification Search
CPC ........... B67C 3/22; B67C 3/222; B67C 11/06; B67C 3/2608; B29C 31/06; B29C 64/321; B33Y 40/00; B29K 105/251; G01F 19/00; B65B 39/00; B65B 21/12; B67D 7/38; B65G 3/16; B65G 3/18; B65G 53/12
USPC ........... 141/70, 255, 264, 286; 406/127–133, 406/146, 138; 222/394, 399
See application file for complete search history.

(56) References Cited

U.S. PATENT DOCUMENTS

| 4,182,383 A | * | 1/1980 | Admomitis ................. B65B 1/16 141/5 |
| 4,379,186 A | | 4/1983 | Bush et al. |
| 4,668,478 A | * | 5/1987 | Homer ..................... G01F 11/18 222/345 |
| 4,986,456 A | * | 1/1991 | Johanson ............. B65D 88/548 222/195 |
| 5,339,871 A | | 8/1994 | Collins et al. |

(Continued)

FOREIGN PATENT DOCUMENTS

| CA | 2895014 A1 | 6/2015 |
| EP | 1916207 A | 10/2007 |
| NO | 20161850 A1 * | 5/2018 |

OTHER PUBLICATIONS http://matsys.com/?p=700, Jul. 9, 2019—matsys website—2014-2015 news feed featured pictures of previous generation models which have been superseded by the current invention.

*Primary Examiner* — Andrew D Stclair
*Assistant Examiner* — Stephae A Shrieves
(74) *Attorney, Agent, or Firm* — Oblon, McClelland, Maier & Neustadt, L.L.P.

(57) ABSTRACT

A device is provided for the controlled and precise delivery of powders, including cohesive powders, based on a fluidization technique to directly reduce inter-particle friction and using a fluidizing gas as an air-bearing. The device preferably includes no moving parts, no sealing gaskets or sealing surfaces. Unlike mechanically actuated valves, the powders dispensed by the current device do not experience mechanical shearing, thereby reducing wear and thus increasing the service life of the apparatus.

10 Claims, 8 Drawing Sheets

(56) References Cited

U.S. PATENT DOCUMENTS

| | | | |
|---|---|---|---|
| 5,727,607 A * | 3/1998 | Ichikawa | B65B 1/16 141/374 |
| 5,826,633 A * | 10/1998 | Parks | B65B 9/042 141/18 |
| 6,182,712 B1 | 2/2001 | Stout et al. | |
| 6,311,745 B1 * | 11/2001 | Welch | B65B 1/16 137/614 |
| 6,340,036 B1 | 1/2002 | Toyoizumi et al. | |
| 6,354,465 B2 | 3/2002 | Bell et al. | |
| 6,357,490 B1 | 3/2002 | Johnston et al. | |
| 6,402,500 B1 * | 6/2002 | Zahrah | B22F 3/004 141/67 |
| 6,684,917 B2 | 2/2004 | Zhu et al. | |
| 6,948,535 B2 | 9/2005 | Stegemoeller | |
| 7,887,264 B2 * | 2/2011 | Naunheimer | B01J 8/0025 208/173 |
| 8,371,342 B2 | 2/2013 | Weigel | |
| 8,763,653 B2 | 7/2014 | Weigel et al. | |
| 8,783,305 B2 | 7/2014 | Naydo et al. | |
| 2004/0060367 A1 * | 4/2004 | Bergman | B65B 1/32 73/861.41 |
| 2006/0086834 A1 * | 4/2006 | Pfeffer | B01F 11/0266 241/5 |
| 2007/0193646 A1 * | 8/2007 | Tapphorn | B22F 3/003 141/2 |
| 2011/0011491 A1 * | 1/2011 | Matsumoto | B65B 1/08 141/72 |
| 2012/0173170 A1 * | 7/2012 | Bhusarapu | F27B 15/08 702/55 |
| 2015/0300375 A1 | 10/2015 | Begon et al. | |
| 2015/0314970 A1 * | 11/2015 | McIlrath | B65G 53/36 406/118 |
| 2016/0221012 A1 * | 8/2016 | Baranovski | B05B 7/144 |
| 2018/0003545 A1 * | 1/2018 | Poole | B65B 1/12 |
| 2018/0172500 A1 * | 6/2018 | Melati Rad | G01G 13/28 |

* cited by examiner

10 Porous Funnel
11 Valve Body
12 Upper Gas Chamber
13 Mounting Points
14 Upper Gas Port
15 Lock Gap Adjuster
16 Lower Gas Supply Port
17 Powder Outlet
18 Lower Porous Disc
19 Upper Gas Supply Port
20 Disc Gas Transport
21 Lower Gas Port
22 Adjuster Spring
23 Powder Lock Gap

FLUIDIZED POWDER VALVE SYSTEM

BACKGROUND

Field

This invention relates to a method to dispense powder materials, more specifically, to an assembly for metering granular or powdered material and to a method for operating the dispensing assembly. The apparatus is comprised of a fluidization container for holding the powdered material, a flat-shaped or planar disk fluidizer to control the discharge of the particulate material which is operatively connected to the container and a controller unit for regulating the fluidization process.

Description of the Related Art

A variety of systems exist for dispensing powdered materials, which could be performed either in an uncontrolled or controlled fashion. Based on the application, a diverse range of devices has been developed to address the specific requirements of the application and attempt to improve upon a previous generation of existing systems. These systems share common structural designs, such as a container for the powder and a modulating section allowing for the regulation of powder flow. Different mechanized features have been used to regulate the flow of the granular material, such as extrusion screws and mechanical valves featuring moving and wearable parts. Although suitable for certain powder types, these mechanical systems are known to fail and require extensive maintenance when powders are abrasive or intrusive. As such, faulty valve operations lead to degraded performance. Furthermore, during a commercial discharge operation it can result in serious consequences, such as worker exposure to hazardous substances, loss of equipment or of production, which can result in costly repair or replacement expenses and manufacturing delays.

Unlike most fluids, many powdered materials are problematic to consistently flow due to their intrinsic physical properties. For example, cohesive forces in fine powders can forbid their flow in traditional dispensing assemblies. Mechanical vibrations or shaking of the feed structure can reduce clumping in the powder and improve dispensing uniformity, but it is inefficient. Additionally, the efficiency of shaking is not necessarily consistent during successive operations, which impacts the repeatability of the process and can yield an inferior or variable product. Specifically, such shaking causes segregation of the finer and coarser as well as the lighter and denser materials, which results in loss of uniformity in the particle size distribution and chemical composition of these powders.

Fluidization of powdered material has been demonstrated as an effective method to reduce inter-particle forces, provide a degree of mixing, and enable transport of powdered material through various mechanical systems. This is typically achieved by the incorporation of a gas-permeable membrane in a section of the assembly, which allows for the introduction of a constant or intermittent gas flow which acts as lubricant between particles.

U.S. Pat. No. 6,311,745 employs a fluidized assembly with a mechanical valve system for controlling the flow of powders. Such valves are known to be prone to jamming, powder intrusion and contamination when certain types of materials are being fluidized. Such is also the case with U.S. Pat. No. 5,988,234 which employs a rotating auger that can induce undesirable friction and grinding of the particles being transferred in addition to being sensitive to abrasive, energetic or explosive-prone powders.

Other prior art disclosures feature fluidization systems which claim to reduce particle cohesion and facilitate flow. Systems such as disclosed in CA 02895014, however require additional subassemblies or subunits to promote or facilitate the discharge of powders after fluidization, which complicates operations and increases the risk of malfunction.

Optimal designs of fluidization devices therefore must avoid the use of closed valves and take advantage of regulated open gaps that naturally block under standard powder deposition due to the intrinsic properties of such powders. The design and disposition of the valve opening of these systems to facilitate powder flow is critical to adjust and modulate flowing properties when under fluidized conditions. U.S. Pat. Publication No. 2012/0132314 features an opened powder opening partially obstructed with a vertical tube where the fluidizing assembly is at the bottom. However, such systems do not facilitate powder flow in the storage container since fluidization is only performed in the recipient container. Moreover, fluidization is limited to the presence of the metering container being present to ensure proper gas seal between the device and recipient. Such a device is limited to specific applications and often fails when dealing with powders with wide particle sizes or distributions. This results in a requirement for extensive optimization which is specific for each material to be dispensed.

SUMMARY

The present embodiment comprises a novel device for the delivery of all powder types, including cohesive powders, based on a unique fluidization technique that directly reduces interparticle friction and uses a fluidizing gas as an air-bearing. In the preferred embodiment, the device comprises no moving parts, no sealing gaskets or sealing surfaces that are interacting with the powder. Unlike the mechanical devices or mechanically actuated valves used in prior concepts, the powders dispensed by the embodiment do not experience mechanical shearing and compression.

In a second embodiment, a novel fluidizer assembly is included that may include at least one wall permeable to gas. A preferred embodiment features two distinct porous sections in the device. These sections may be made of a rigid material having microscopic holes therein with sufficient porosity to permit the escape of gas and thus fluidize a substance. Alternatively, this porous material may possess flexibility and be adaptable to various shapes and geometries.

Another embodiment is a fluidized device including a funnel section constituted of a cone or plate with ultrafine pores (i.e., micro- to sub-micrometer pore size), which, in preferred configurations, can be made from porous stainless steel. The porous section allows for dry gas to pass through the material and improves the flow rate of the powder by reducing its friction with the funnel wall.

In one embodiment, an adjustable dispensing opening/valve is provided, allowing the powders to remain at rest in standard static conditions while enabling the flow of the materials upon fluidization. In a preferred configuration, the top plate or section of the stop valve assembly is composed of a sub-micro-scale porous material. This feature is made possible by the design of a gap adjacent to two distinct fluidizing surfaces, which creates a static state of no flow, or powder lock, when the gas is off.

An optional extension to the system is possible, either as an integral or as a separate part of the separate embodiment.

The assembly, with the extension connected to the funnel section of the powder valve, can provide an increase in the maximum capacity of the system. The extension can also serve to connect another powder processing apparatus or device to the powder valve wherein operations are improved for expediency and powder handling efficiency.

A controlling unit is preferably used to regulate the gas controls (flow rate and type) for the powder valve system. These controls regulate powder fluidization in relation to dispensing of the powder through the funnel opening and stop valve gap. In one embodiment, multiple independent pressure regulators and pneumatic solenoids are used to regulate the flow of gas to each of the two-independent fluidizers.

It will be recognized by one skilled in the art that the present embodiments find applicability for most coarse to fine powders encountered in pharmaceuticals, metal work, food industry, cosmetics and polymer industry to only name a few. The application and spirit of the embodiments outlined herein to advanced manufacturing practices, in particular to additive manufacturing (i.e., 3D printing), will provide an answer that overcomes the current limitations imposed by the necessity to use spherical powders which possess more favorable flow characteristics. At present, this evolving area of powder metallurgy and processing industries still relies on a limited number of supply chains for machines and feedstock materials. In turn, this poses a challenge to being able to facilitate a more widespread use of additive manufacturing for functional part production. The development of the technology, as disclosed in this patent, which allows for dispensing non-spherical and custom powder blends with varying size distributions has the potential to revolutionize the field and propel it to the next level.

DETAILED DESCRIPTION

The present embodiment describes a new method and apparatus for dispensing powder in a controlled fashion. Powders displaying poor flow properties are the preferred material for such device, and it will be recognized that any powdered or granular material will benefit from the embodiment.

Figure 1:
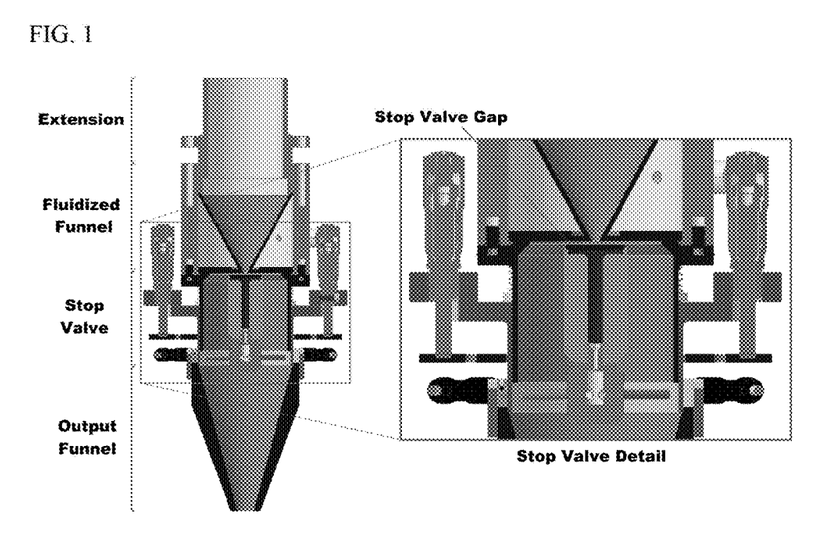
FIG. 1 presents a schematic cross view of the different sections of the powder valve assembly.

As shown in FIG. 1, an embodiment presented herein is composed of an extension, a fluidization funnel, a fluidization stop-valve assembly, featuring a gap which stops the vertical motion of the powder in the absence of a gas flow while promoting flow when enabled, and an optional output funnel segment to customize the dispensing operation for the powder recipient configuration for specific applications.

The extension acts as a reservoir to increase the maximum powder holding capacity to be dispensed by the fluidized assembly. In one embodiment, the extension unit features one or multiple gas vents. In a separate embodiment, it can serve as a direct conduit to connect another powder processing apparatus to the valve system. In a preferred embodiment, the extension has a capacity up to 2 liters, or between 0.1 liter and 1 liter. In another embodiment, the extension can have a capacity between 1 liter and 20 liters. In a separate embodiment, the assembly can be directly connected to a large bulk container, providing a type of extension with a commercial capacity. Such a setup is desirable in many installations, including for the large-scale dispensing of powders as part of a manufacturing process.

Figure 2:
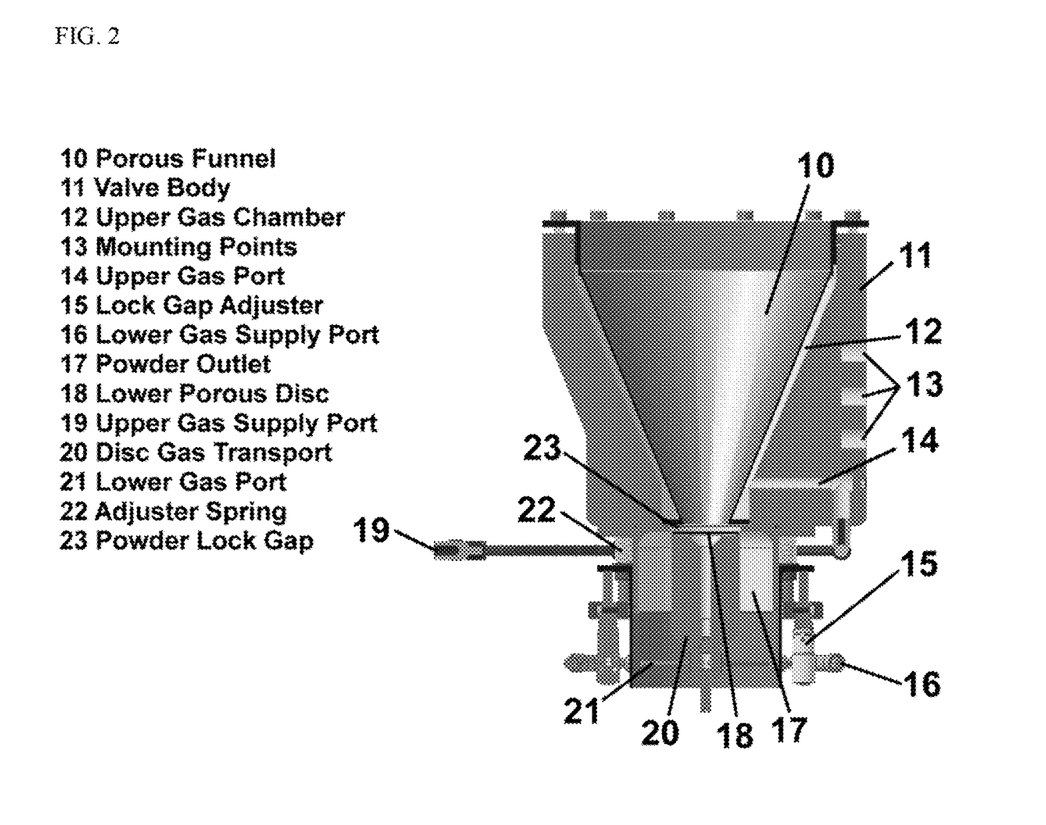
FIG. 2 shows a detailed view of the components of the powder valve.

FIG. 2 offers a schematic view of one embodiment and its various components. The porous funnel 10 is encased in a valve body 11 which protects and physically hosts the various components. The design of the interior portion of the valve body 11 is critical, as it hosts a cavity serving as gas chamber 12 for the fluidization of the top section through the funnel 10 membrane. Gas is introduced to the gas chamber 12 via a port 14 which is connected to the gas supply line 19. In another embodiment, the valve body 11 can feature optional mounting points 13 to secure the powder valve to setups relevant to specific applications. Alternatively, the valve body 11 can be modified at the bottom section as low as below the stop valve assembly to allow for mounting to a support or another device.

The bottom section of the powder valve centers around the stop valve and its porous disk 18 positioned atop of the piece. Positioning the porous section of the stop valve at the gap between its emplacement and the fluidized funnel promotes a vertical lifting force for the fluidization of the stop valve. The pressure thus exerted by gas flowing through the fluidization stop valve allows for overcoming gravitational effects imposed on the powders, and mitigating inter-particle cohesive forces, thereby imparting the powder mass with a fluid-like behavior, wherein it enables the fluidized dispensing of the material. A lower gas supply line 16 brings gas to the stop valve via a series of intermediate gas ports 20 and 21, which act as conduits from the supply line to the porous disk 18 of the stop valve. In certain embodiments, there may be a single stem for bringing gas to the stop valve, or there may be a plurality of stems for bringing gas to the stop valve, such as two, three or four stems. In preferred embodiments, there are three or four such stems.

One skilled in the art will recognize that the functioning principles of the embodiment will remain the same independent of the relative position of gas lines 16 and 19. According to another embodiment, the gas assembly for the funnel can be attached at the top of the valve body 11. Such arrangement could provide many benefits for specific applications of the dispensing operation. In a separate embodiment, the connections for bringing gas to the porous stop valve assembly 18 may be accomplished in a horizontal manner, with lines 20, 21 and 16 positioned laterally relative to the position to the porous disk 18. Alternative structural designs that change the location of the various components are also part of the current embodiment.

Figure 3:
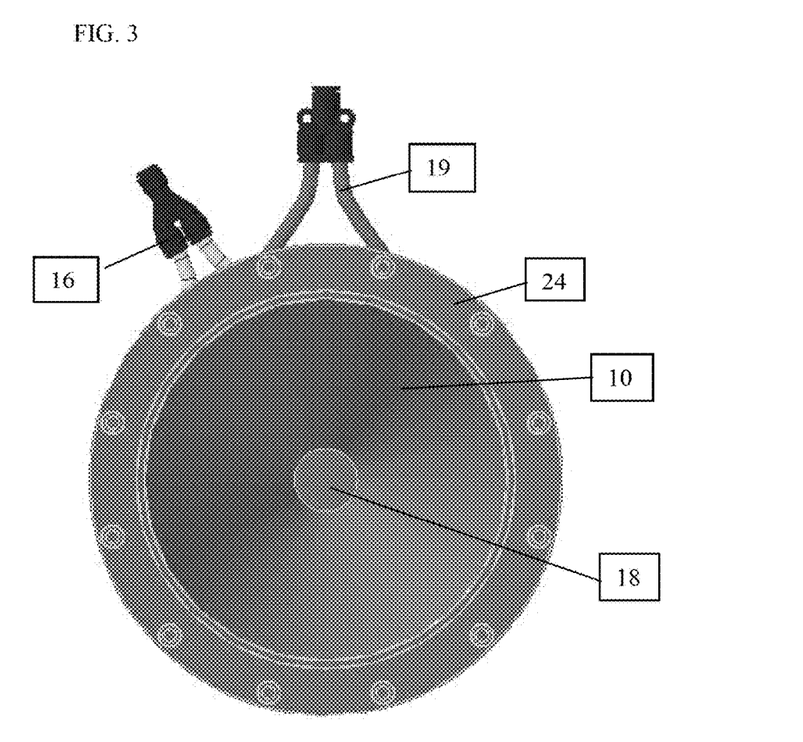
FIG. 3 shows a top view of the device.

FIG. 3 shows in a schematic illustration an embodiment of the top view of the funnel section according to the embodiment. The nature of the powder valve allows for adequate pressure relief of the system when fluidization is activated and gas flows through the device and powder bed. That is, the valve can be operated in an open or closed environment such that, if necessary, the powders can be contained in an inert or reactive environment. In an embodiment, a flange 24 secures the top of the assembly. In a preferred embodiment, the flange is designed to partially enter and cover the conical section of the funnel 10, offering to protect the unique characteristics or advantageous properties of the powders contained in the assembly. Similarly, the connectivity between the extension section and the fluidization funnel can be accomplished with a custom flange 24, or via attachments on the valve body 11 itself.

In an embodiment the flange 24 is an integral part of the assembly and bound to the funnel 10, whereas other modes of attachment or assembly such as using O-rings are also within the scope of the present embodiment. A preferred embodiment features a gap 23 between the fluidized funnel 10 and stop valve 18.

Figure 4:
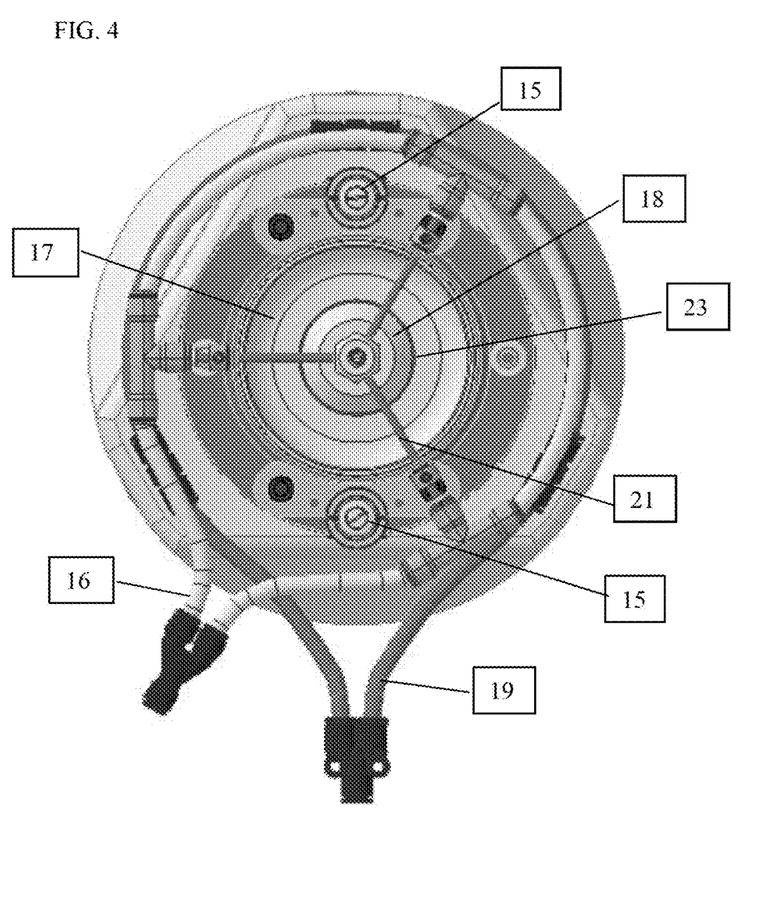
FIG. 4 presents an illustrative view of the device from the bottom.

The concentric gap 23 between the funnel 10 and the porous plate of the stop valve 18 is apparent in the illustration of a bottom view of some embodiments as seen in FIG. 4. Upon fluidization, powder movement is enabled from the funnel 10, through the gap 23 and to the powder outlet 17. Note, while the illustration in the figure shows the gap 23 as concentric, other opening arrangements are equally possible within the scope of the present embodiment.

One factor influencing the powder flow rate is the pressure of gas exerted on both fluidizers. Fluidization is obtained upon regulating gas pressure to both fluidization sections in the range of 0 to 20 psi in one embodiment, alternatively 0 to 10 psi and preferably 0 to 5 psi or 0.5 to 5 psi. The gas flow rates in these components can be operated in the range of 0 to 50 SCFH, 0 to 30 SCFH and preferably 0 to 20 SCFH or 2 to 20 SCFH. One skilled in the art will recognize that powder valves in the present embodiment will require different gas flow rates and pressures based on the material used and on the size of the overall powder unit itself.

Another embodiment allows for using different gas pressures and flow rates in the funnel and the fluidized stop valve. The specific physical properties of the powders and requirement for dispensing quantities and rate will influence the gas parameters to use with the powder valve. As such, any combination of gas pressure between the funnel 10 and the porous plate of the stop valve 18 can be used as part of the present embodiment. Under these settings, the gas flow can be operated in continuous manner or in a series of pulses. In one embodiment, any duration, intensity and number of gas pulses can be used to promote the fluidized dispensing of powders in any specific applications using the present embodiment. A preferred embodiment features the use of pulses in conjunction with a load cell to dispense the powder materials.

Another parameter influencing the flow rate of powders through the device is the size of the funnel opening at the junction with the powder gap 23 and stop valve 18. In one embodiment, the funnel 10 opening can range between 0.01 and 1.00 inch (0.025 and 2.54 cm). In a preferred embodiment, the bottom opening of the funnel can be between 0.03 and 0.30 inches (0.07 and 0.76 cm). In a similar manner, devices under this embodiment can feature stop valve plates (18) of various dimensions, ranging from 0.20 to 5.0 inches (0.50 to 12.70 cm), and from 0.50 to 2.0 inches (1.27 to 5.08 cm) in a preferred embodiment. It is noteworthy that commercial applications of the embodiment described herein may feature superior dimensions due to the large volume of powders to be dispensed. In commercial applications requiring large volumes of powders to be dispensed, the respective dimensions may be larger than those above. For example, in some embodiments, the top funnel opening in such applications can range from ¾ to 36 inches (1.9 to 91 cm), the bottom funnel opening can range from 0.05 to 6 inches (0.13 to 15.2 cm), and the stop valve plate can range from 0.25 to 9 inches (0.64 to 22.9 cm).

Figure 5:
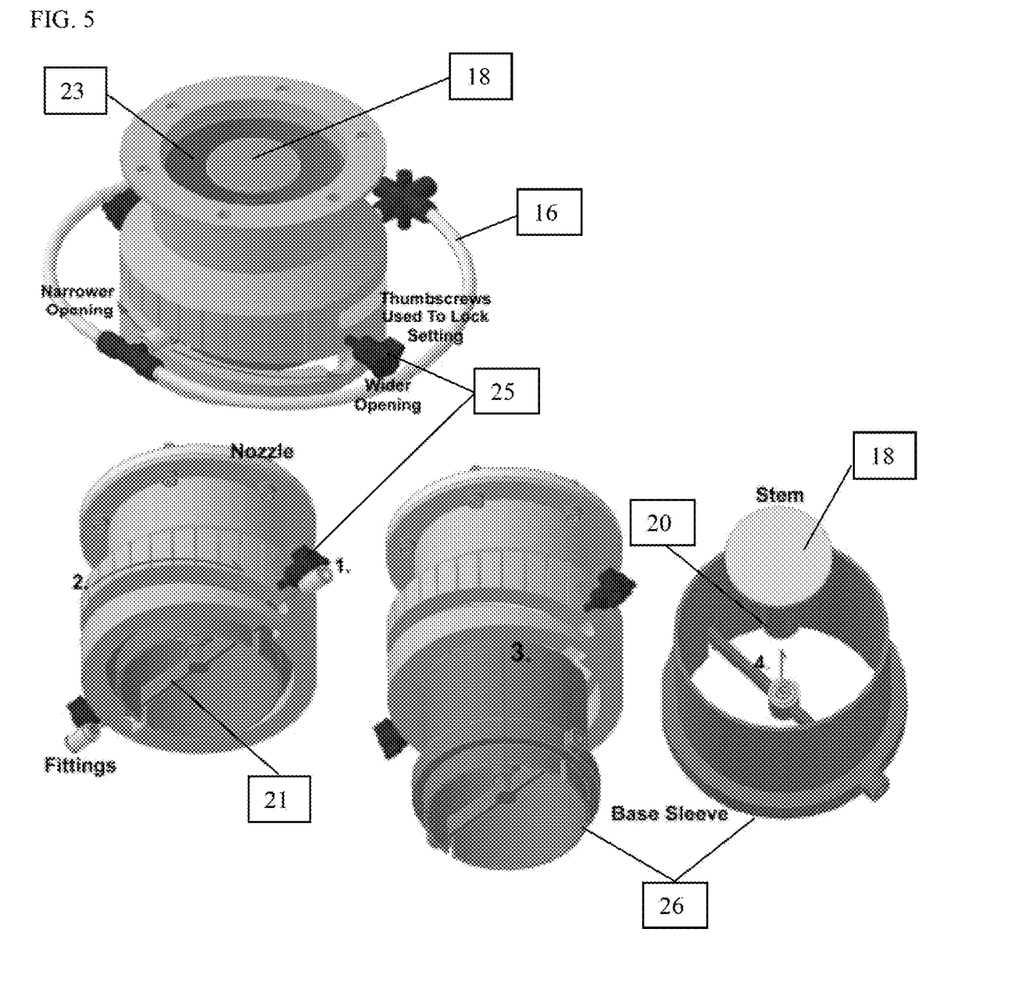
FIG. 5 shows cam-operated components for regulating the powder gap.
Figure 6:
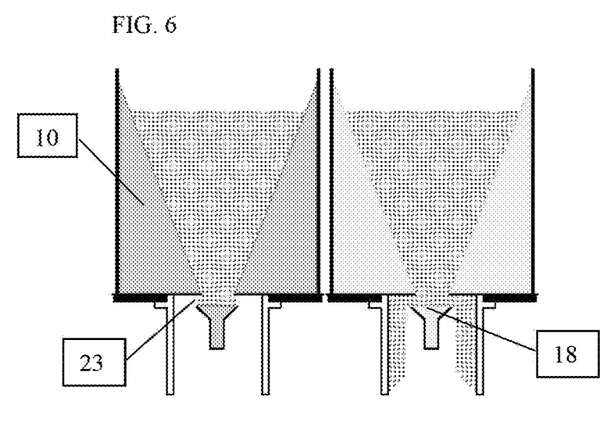
FIG. 6 presents a schematic representation of the system at rest and upon fluidization of the components.

The gap 23 between the funnel and stop valve plate 18 also has considerable influence on the gas pressure and flow rate requirements necessary to induce powder flow. One embodiment allows for the size of the gap to be adjusted to customize the fluidized dispensing of the powders to the specific applications. Having the ability to tune and adjust the gap size to scale relative to different powders or granular material constitutes a significant advantage of the current embodiment over prior art devices. Furthermore, this ability to easily customize the system makes the device versatile for a wide range of powders, varying in particle size, size distributions, cohesive and agglomeration tendencies. In one embodiment, the gap dimensions can be adjusted by micrometer adjusters 15 (FIGS. 2 and 4). In a preferred embodiment, the powder valve features between two and four micrometer adjusters. These adjusters can be operated manually or remotely via the use of an automated or computer-assisted system.

In another embodiment, the gap between the two fluidizers is adjusted using a cam-operated system, as schematically illustrated in FIG. 5. Strategically designed fittings 25 are thus used to control the vertical motion of a base sleeve 26 and thus regulate the size of the gap 23 between the bottom section of the funnel 10 and the stem section of the stop valve fluidizer 18. Another embodiment allows the adjustment of the gap by the use of other screw-based systems that will not require the use of a sleeve. One skilled in the art will recognize that other such mechanisms can be used to modulate the gap between the two fluidizers.

The orientation and geometry of the powder gap 23 serves to regulate the flow of powders upon fluidization. Powders with micro- to sub-micrometer-size particles tend to agglomerate due to cohesive forces between particles. This agglomeration of particles enables the stop valve to act as a cap thus preventing any particle flow (FIG. 6). Under these conditions, Van der Waals forces prevail between particles and particle-funnel friction, allowing powders to stay at rest in the funnel assembly without movement. The introduction of a gas flow through the porous funnel and porous stop valve plate counteracts friction forces and the gas acts as a lubricant between particles. The fluidization of powders is thus enabled and the material is allowed to flow in the gap between the two fluidized parts. Interrupting the gas flow disrupts the fluidized state and particles resume their static state. Thus, an embodiment relates to a method of dispensing a powder material, comprising introducing a gas flow through the porous funnel and/or through the porous stop valve plate, whereby the powder material flows through the gap, and then ending the gas flow through the porous funnel and/or through the porous stop valve plate, whereby the powder material stops flowing through the gap. As a preferred embodiment, the flow of powders is thus achieved by controlling the gas pressure and flow rate through the porous membranes without requiring any moving part or mechanical system.

In certain embodiments, the exclusion of moving parts does not exclude moving parts associated with adjusting the gap between the funnel and stop valve plate. For example, in such embodiments, the exclusion of moving parts does not exclude micrometer adjusters 15 as depicted in FIGS. 2 and 4. Similarly, in such embodiments, the exclusion of moving parts does not exclude moving parts associated with the cam-operated system for adjusting the gap depicted in FIG. 5, or screw-based systems for adjusting the gap. Instead, the exclusion of moving parts in such embodiments relates to excluding moving parts whose motion is directly responsible for the movement of powder material, such as extrusion screws, augers, vibrational devices, and blower devices that forcibly blow powder material through an outlet. In this sense, moving parts whose motion is directly responsible for the movement of powder material would be considered to be moving parts involved in the dispensing operation. In such embodiments, the movement of powder material is effected by fluidization of the powder material, and movement of the fluidized powder material by gravity, rather than by contacting the powder material with a mechanical device with moving parts, such as extrusion screws, augers, vibrational devices, and blower devices that forcibly blow powder material through an outlet.

The unique mechanism outlined in the current embodiment minimizes the disruption of the flow of powders being dispensed, including shearing effects which could impact and alter the particle size of the material. Avoiding particle shear also reduces the wear on the powder valve components thereby increasing its lifetime. In contrast to other devices, the fluidization of the entire funnel section allows for the uniform fluidization of the powders, which leads to an accurate and reproducible dispensing of the material. This feature also offers a significant advantage over the prior art of attaining the uniform fluidization of powders possessing a wide or multi-modal particle size distribution, thus avoiding the separation of particles of different sizes during the dispensing event. As a consequence, the embodiment promotes a mass flow condition for powders, as compared to the traditional and inferior funnel-flow which exhibits high friction characteristics.

The absence of moving parts avoids any potential contamination from lubricated mechanisms. In another embodiment, the internal surfaces of the powder valve are mirror-polished to minimize interactions between particles and walls and thus powder build-up on the internal components of the device. In a preferred embodiment, the device features a modular design, which allows for easy servicing of all components. This modular design also enables the rapid replacement of parts or sections and streamlines cleaning operations of the various porous elements in the event of contamination and/or clogging. In a preferred embodiment, the powder valve device can be disassembled and reassembled with parts of different sizes and porosity, allowing for an expedient customization of the system to perform with different powder types and applications. Examples of such customization include but are not limited to: extender+ small opening funnel+small scale stop valve assembly for precise and repetitive dispensing, or large opening funnel+ small scale stop valve for routine dispensing of large quantities of coarse granular material.

Figure 7:
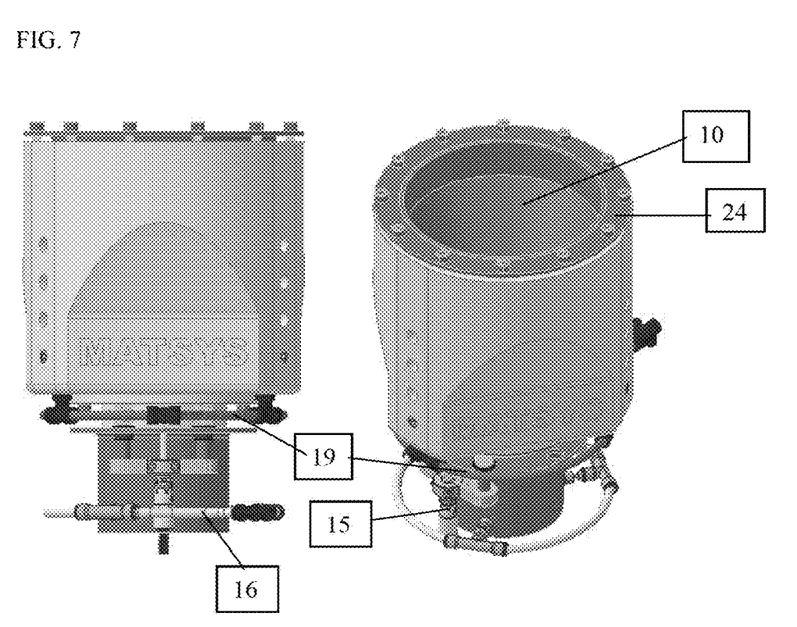
FIG. 7 shows a side view of an assembled powder valve design.

FIG. 7 shows a side view illustrating the funnel and stop valve sections of an embodiment. One skilled in the art will recognize that the basic physical principles involved in the function of the embodiment allows for its performance at significantly different scales. Accordingly, the device can be scaled as such to dispense powders at the sub-gram level with high precision. Alternatively, an identical device of larger dimensions with adjusted size parts can be used to dispense materials on multi-kilogram scale by using the same functional mechanism and principles.

In an embodiment, the porous fluidized funnel and stop valve are made of porous metals, or polymers, or plastics. In a preferred embodiment, the fluidizers are made of stainless steel, Hastelloy or aluminum. Alternatively, these parts can be made of a porous plastic, preferably a thermoplastic such as polyethylene (e.g., high-density polyethylene). Such porous materials can have a porosity of up to 50 microns, up to 40 microns, up to 10 microns, or preferably 0.5 to 10 microns. Another embodiment features fluidizers composed of polytetrafluoroethylene or other such thermoplastic materials. In yet another embodiment the key components of the fluidizer could be composed of high quality sintered ceramic materials. Additionally, the auxiliary components, such as extension section, gas feed lines and fittings could be composed of plastics or metals as determined by the environmental conditions during the operation of the valve and the nature of the application.

Figure 8:
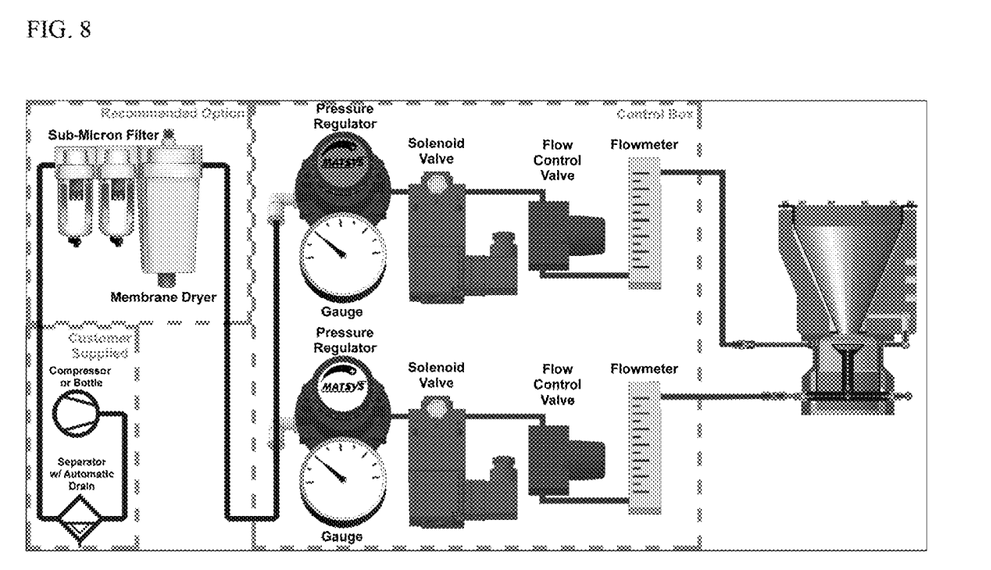
FIG. 8 presents an illustrative depiction of a gas control cabinet/setup.

A preferred embodiment relies on the synergistic use of two independent fluidizers to order the powder flow from the valve. The gas controls for the embodiment can be independently operated from the system or be part of a centralized cabinet housing containing all necessary components (FIG. 8). These controls regulate powder fluidization in relation to their dispensing through the funnel opening and stop valve gap 23. Another embodiment features two independent pressure regulators and pneumatic solenoids used to regulate the flow of gas to each of the two independent fluidizer parts, namely the fluidized funnel 10 and stop valve 18.

Two flow control valves and meters are used to monitor the gas flow to each of the two fluidizers separately. These optional components can operate at between 0-50 SCFH, between 0-30 SCFH and preferably between 0-20 SCFH. As stated before, one skilled in the art will recognize that powder valves in the present embodiment will require different gas flow rates and pressures based on the material used and on the size of the overall powder unit itself. Factors such as dimensions and surface area, resistance and external gas lines configuration among others will influence these parameters. Other considerations will have to be given to the porosity of the fluidizer materials themselves, the density, volume and physical properties of the powders to be fluidized.

The use of low gas pressure to fluidize powders exemplifies another advantage of the embodiment compared to other prior or current technologies. Low gas pressure is instrumental in minimizing powder segregation and channeling. In an embodiment, the judicious control of the relative gas output to both fluidizers allows the powder valve to modulate powder flow through the stop gap. The use of inappropriately set gas pressures and flow rates would result in segregation in the fluidized powder. Therefore, it is understood that different gas pressures may be required for different materials, and the two fluidizers may require different settings for optimal performance.

In an embodiment, powder dispensing can be performed under a constant gas input, leading to a continuous flow of material. Alternatively, controlled discharge of powder can be operated under pulse-based operations, where the gas is enabled and disabled in an alternate manner. The selection of dosing mode will vary based on the application and material dispensed. The ability to operate in a dosing mode lends itself to greater automation and efficiency in possibly filling and dispensing powder or granular materials into more than receptacle if placed in an assembly line type operation.

The precise delivery or quantification of powders dispensed can be achieved in various methods. One method is the quantification of the powders by measuring the quantity collected in the recipient by either volumetric or gravimetric means. Other powders or applications may be more suitable to a time-controlled dosing. In another embodiment, a load cell can be incorporated in the assembly of this embodiment to enable the direct measurement and control of the quantity of powders dispensed. Alternatively, the device can be equipped with an optical laser sensor and digital cycle counter to record flow rates with a precise accuracy. Such a setup can enable dosing accuracies in the range of +/−0.01% to 0.1% and reduce potential errors due to human interactions and data collection.

The fluidized valve described in this embodiment can be operated by manually operating the gas controls. This is accomplished by activating the gas flow to the fluidized funnel and the fluidized stop valve. The flow of powder is discontinued by stopping the gas flow to the fluidizers. In another embodiment, the powder valve can be operated remotely by computer interface. This dosing mode, particularly suitable in conjunction with an interfaced load cell, features the use of a custom software to regulate dispensing operations via an automated control of the gas flow. Such a dosing mode allows for the control of dispensing operations as function of time, quantity or other desirable parameter relevant for specific applications. In a preferred embodiment, the integration of these components in a computer-based control unit allows the automation of the embodiment disclosed herein.

It will be appreciated by those skilled in the art that modifications can be made to the embodiments disclosed and remain within the inventive concept. Therefore, the claims are not limited to the specific embodiments disclosed, but are intended to cover changes within the scope and spirit of the claims.

The invention claimed is:

1. A device configured for the delivery and metering of powders or granular materials, comprising:
an extension or container configured for holding the powders or granular materials to be dispensed,
a fluidization funnel assembly, wherein the extension or container is operatively connected to the fluidization funnel assembly;
a fluidization stop valve assembly which is surrounded by an aperture or gap separating the fluidization funnel assembly and the fluidization stop valve assembly; and
a gas port,
wherein in a dispensing operation, the fluidization funnel assembly is configured to receive the powders or granular materials from the extension or container and lead the received powder or granular materials to the fluidization stop valve assembly,
wherein the dispensing operation is performed without any mechanical movement of parts,
wherein the fluidization stop valve assembly comprises a porous top plate and hollow section configured to allow the transport of gas from one or more supply lines, via the gas port, to a porous section of the fluidization stop valve assembly, the porous top plate being disposed between the fluidization funnel assembly and both the hollow section and the gas port, and the porous top plate opposes a bottom opening of the fluidization funnel assembly, and the porous top plate and hollow section are disposed along a center axis of the fluidization stop valve assembly such that the hollow section is surrounded by a powder outlet region through which the powders or granular materials are dispensed during the dispensing operation,
wherein the aperture or gap separating the fluidization funnel assembly and fluidization stop valve assembly, is annular and the device includes micrometer adjusters configured to adjust the gap for the dispensing of powders and granular materials of varying flow characteristics,
wherein the fluidization funnel assembly and fluidization stop valve assembly are configured to be operated at pressures below 5 psi, and
wherein the fluidization funnel assembly and fluidization stop valve assembly comprise a sub-micrometer porous material.

2. The device of claim 1, configured such that the powders or granular materials are statically immobile when at rest, and such that powder flow is initiated upon the application of a gas pressure and flow rate to the fluidization funnel assembly and/or the fluidization stop valve assembly.

3. The device of claim 1, wherein the fluidization funnel assembly comprises a valve body, a porous funnel and funnel opening, wherein a cavity between the valve body and porous funnel is configured to act as a gas conduit for the fluidization.

4. The device of claim 1, wherein the fluidization funnel assembly and fluidization stop valve assembly are configured to be operated together or independently with different gas pressures and flow rates in a continuous or pulsating manner.

5. The device of claim 1, further comprising gas controls that are centralized in a control module and that are configured to be operated manually or remotely via computer interface.

6. The device of claim 1, which configured to allow attachment of a closed-loop dispensing control system.

7. The device of claim 1, further comprising a determination of mass change apparatus comprising a load cell or an automated optical laser sensor and digital cycle counter.

8. The device of claim 1, configured such that a dry fluidizing gas can be used to shield dispensed dry powdered materials from moisture/humidity either during dispensing operation, or at a lower flowrate when not in use.

9. The device of claim 1, configured to dispense powders in single batch, semi-continuous, and continuous modes.

10. The device of claim 1, further comprising an output funnel, the fluidization stop valve assembly being disposed between the fluidization funnel assembly and the output funnel, the output funnel being configured to receive the powders or granular materials from the powder outlet region, the powder outlet region is disposed to be merged continuously with a top opening of the output funnel such that a width of the powder outlet region corresponds to a width of the top opening of the output funnel.

* * * * *